United States Patent
DeKeyser

(10) Patent No.: US 11,428,360 B1
(45) Date of Patent: Aug. 30, 2022

(54) VERTICAL PIG LAUNCHER AND METHOD OF USING SAME

(71) Applicant: R.W. Lyall & Company, Inc., Corona, CA (US)

(72) Inventor: William DeKeyser, Franklin, WI (US)

(73) Assignee: R.W. LYALL & COMPANY, INC., Corona, CA (US)

( * ) Notice: Subject to any disclaimer, the term of this patent is extended or adjusted under 35 U.S.C. 154(b) by 1199 days.

(21) Appl. No.: 14/511,995

(22) Filed: Oct. 10, 2014

(51) Int. Cl.
*F16L 55/46* (2006.01)
*B08B 9/055* (2006.01)
*F16L 55/44* (2006.01)

(52) U.S. Cl.
CPC ............. *F16L 55/46* (2013.01); *B08B 9/055* (2013.01); *F16L 55/44* (2013.01)

(58) Field of Classification Search
CPC . F16L 55/44; F16L 55/46; F16L 55/26; B08B 9/055; B08B 9/027; B08B 9/02; B08B 9/032; B08B 9/0328
USPC ................. 15/104.062, 3.5, 104.04, 104.061
See application file for complete search history.

(56) References Cited

U.S. PATENT DOCUMENTS

| | | | |
|---|---|---|---|
| 3,125,116 A | 3/1964 | Schaberg | |
| 3,186,014 A | 6/1965 | Alien | |
| 3,218,660 A | 11/1965 | Eagleton | |
| 3,246,355 A | 4/1966 | Scoy | |
| 3,473,550 A | 10/1969 | Ford | |
| 4,073,303 A | 2/1978 | Foley | |
| 4,135,949 A * | 1/1979 | Reese | F16L 55/46 134/18 |
| 4,401,133 A * | 8/1983 | Lankston | B08B 9/055 137/268 |
| 5,139,576 A * | 8/1992 | Davis | F16L 55/46 134/18 |
| 5,769,955 A | 6/1998 | Kozisek | |
| 5,913,637 A * | 6/1999 | Rajabali | 405/169 |
| 5,967,699 A * | 10/1999 | Knapp | B08B 9/0553 15/104.061 |
| 6,022,421 A * | 2/2000 | Bath | B08B 9/055 134/18 |
| 6,336,238 B1 | 1/2002 | Tarlton | |
| 6,475,294 B2 | 11/2002 | McCanna et al. | |
| 6,537,383 B1 | 3/2003 | Mandke et al. | |
| 6,596,089 B2 | 7/2003 | Smith et al. | |
| 6,769,152 B1 * | 8/2004 | Crenshaw | F16L 55/46 15/104.062 |
| 6,789,152 B2 | 9/2004 | Hoese et al. | |
| 6,841,007 B1 * | 1/2005 | Howard | B01D 29/114 134/8 |
| 2002/0053354 A1 * | 5/2002 | McCanna | B08B 9/055 134/8 |
| 2002/0116776 A1 * | 8/2002 | Stracke | B08B 9/055 15/104.062 |
| 2013/0212820 A1 | 8/2013 | Burns et al. | |

\* cited by examiner

*Primary Examiner* — Laura Cguidotti
*Assistant Examiner* — Robert F Neibaur
(74) *Attorney, Agent, or Firm* — Wissing Miller LLP

(57) ABSTRACT

A vertical barrel of an internal diameter to receive a pig having a selected uncompressible diameter, a reducer to compress the pig to a compressed diameter and a fluid system to introduce fluid pressure into the upper end of the barrel to drive the pig through the reducer.

8 Claims, 2 Drawing Sheets

VERTICAL PIG LAUNCHER AND METHOD OF USING SAME

BACKGROUND

The present invention relates to launching devices for launching a pig into a pipeline.

DESCRIPTION OF THE PRIOR ART

Pipeline pigs are used for to treat various conditions pipelines. Pipelines themselves can be relatively short such as, for instance, in connecting a producing field to a refinery but many extend for long distances, up to many miles, sometimes on the earth's surface but usually under the surface. Pipelines are used to transport oil and gas at pressures of from a couple hundred psi to up to 2000-3000 psi or more moving high volumes.

Natural gas and Crude oil, including water produced in connection with crude oil, frequently include insoluble components such as sand, rocks, and other residue that tend to settle in low places in a pipeline. It is necessary to occasionally remove the insoluble contaminants by, for instance pigs, or they may accumulate to the point where they interfere with the flow of liquid or gasses through the pipeline itself. Further, the interior of pipelines can become coated with paraffin and other contaminants which should occasionally be removed, also as by passing a pig through the pipelines.

In addition to cleaning pigs may be used to inspect pipelines (smart pigs). Either way, the process typically involves inserting the pig into a "pig launcher" to be introduced into the pipeline. The launcher is then closed off and pressure introduced to flow product in the pipeline to push the pig along the pipe to perform its cleaning or inspection function until it reaches a receiving trap known as the "pig catcher".

Lease automatic custody transfer units, or LACT units, are located at well pads where oil, natural gas and water are being produced and serve as branches into the main pipeline. From these well pads the pipeline fluids can be transferred by truck or pipeline. Small branch lines are used to convey the fluid to the main pipelines. LACT units are a typical starting location for these branch lines on the well pad. Typically these branch lines are not served by the pig launchers and are not cleaned by mainline pigging. However, these lines still can become obstructed with insoluble debris which should be pigged. My vertical pig launcher occupies a minimum footprint on the well pad and allows for these branch lines to be pigged.

Horizontal pig launchers are common for main lines but occupy considerable space on a well pad so there is a preference at LACT units, or other branch line initiation points, to utilize vertical launchers which occupy a relatively modest amount of space. Various launchers have been proposed for launching different configurations of pigs.

In this regard, pigs take numerous different shapes, including elongated cylindrical somewhat bullet shaped configurations, oftentimes constructed with various components such as wire brushes or cleaning elements on the periphery or even intelligence systems for inspecting the pipeline itself. The periphery cleaning elements may be compressed radially inwardly somewhat resulting in the overall diameter of the pig being reduced to the inside diameter of the pipeline.

One form of a pig is a soft, bullet shaped polyurethane foam plug forced through pipelines to separate the products to reduce their mixing. Some cleaning pigs have tungsten plugs or abrasive wire mesh or the like on the outside to cut rust, scale or paraffin wax deposits from the inside of the pipe. The plug bristles or mesh are often compressible so they can be compressed down to a smaller diameter pig. Others are constructed of plastic covered polyurethane.

It has been proposed to configure the loading end of a cylindrical pig with a bell shape and encircling the circumference with a plurality of foam rings. A pig of this type is shown in U.S. Pat. No. 5,697,699 to Knapp. Knapp designed his pig for launching from a deep sea platform through a bell shaped nipple to guide the pig as it is dropped into a long vertical riser for travelling down to the ocean floor and passing through a valve to a shore line.

A proposal for a launcher to launch spherical pigs into an underground pipeline of a particular diameter suggests the provision of a vertical barrel having an interior diameter larger than that of a spherical pig and dropping the pig by gravity into a subterranean reducing elbow which reduces the diameter of the pig to that corresponding with that of the pipeline to be pigged and then pressurizing the barrel to force the pig through the elbow. A device of this type is shown in U.S. Pat. No. 6,769,152 to Crenshaw. Such devices, while offering some benefit for spherical pigs, have the shortcoming that they are not conveniently mounted on LACT units and do not conveniently accommodate elongated pigs.

SUMMARY OF THE INVENTION

The pipeline pig launcher of the present invention includes a vertical barrel having an interior diameter larger than that of an uncompressed pig. A reducer below the barrel is necked down to a reduced internal diameter smaller than that of the unconstrained pig to compress the external diameter of the pig as it passes there through. Valving is included for pressurizing behind the pig to drive it through the reducer and into the pipeline. The entire unit may be mounted on a header system to allow multiple LACTS or other measurement equipment to feed into one pipeline.

DETAILED DESCRIPTION OF THE PREFERRED EMBODIMENTS

Figure 1:
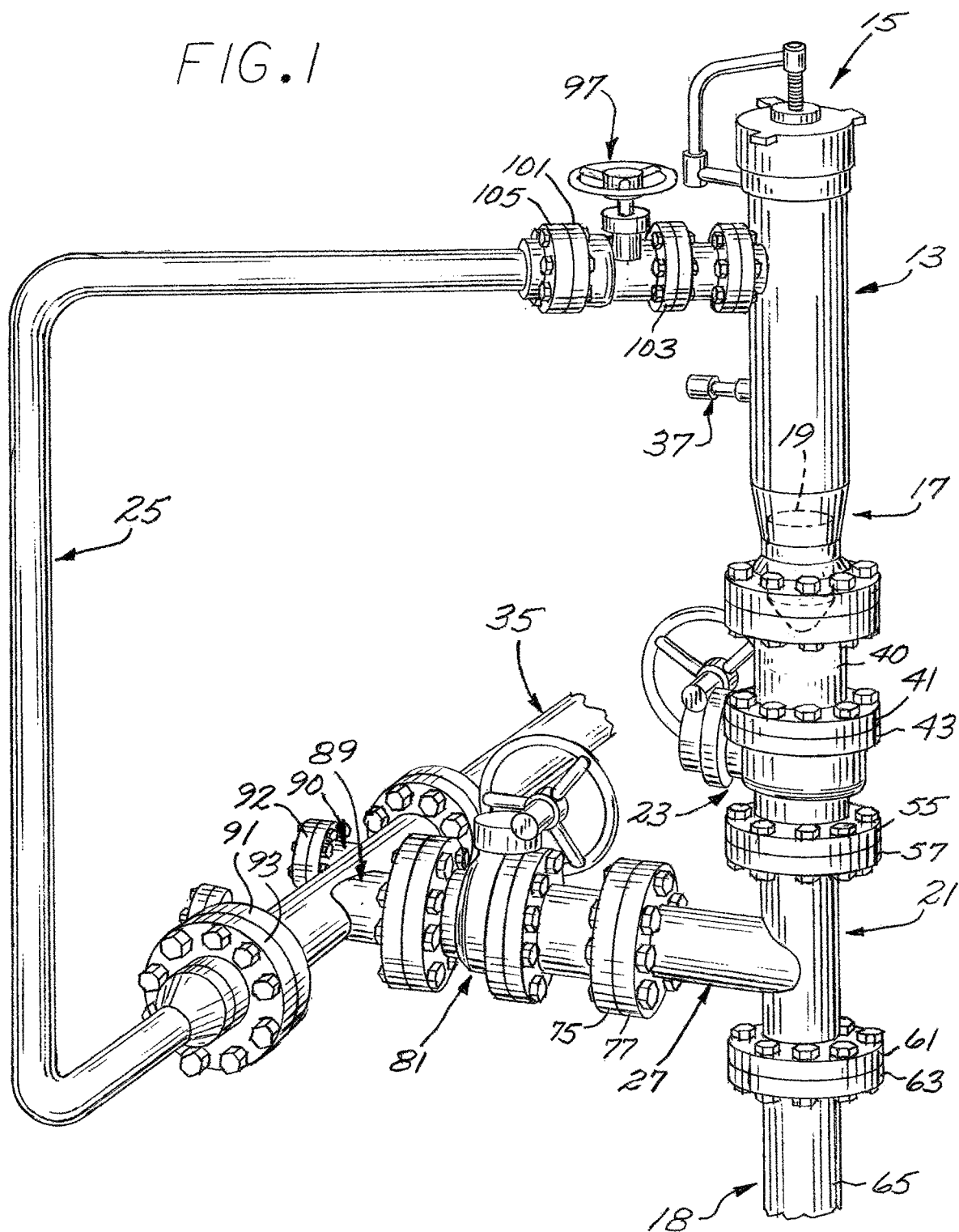
FIG. 1 is a perspective view of a vertical pig launcher embodying the present invention.

The pig launcher of the present invention is prefabricated at a manufacturing plant and includes, generally, a vertical barrel 13 having a closure 15 at the top end thereof and configured in the lower extremity with a reduced-in-diameter conical funnel defining a reducer 17 having a diameter corresponding with that of the pipeline 18 to be pigged by a pig 19. The reducer 17 feeds to a vertical connector pipe 21 which includes a launcher valve 23 above a pipeline valve 81 tied into the vertical pipe. A kicker pipe, generally designated 25, leads from a supply pipe 35 and connects a supply line 35 to the upper portion of the barrel 13. A feed pipe, generally designated 27, leads from a pipeline valve 81 to the connector pipe 21 below the launcher valve 23.

Figure 2:
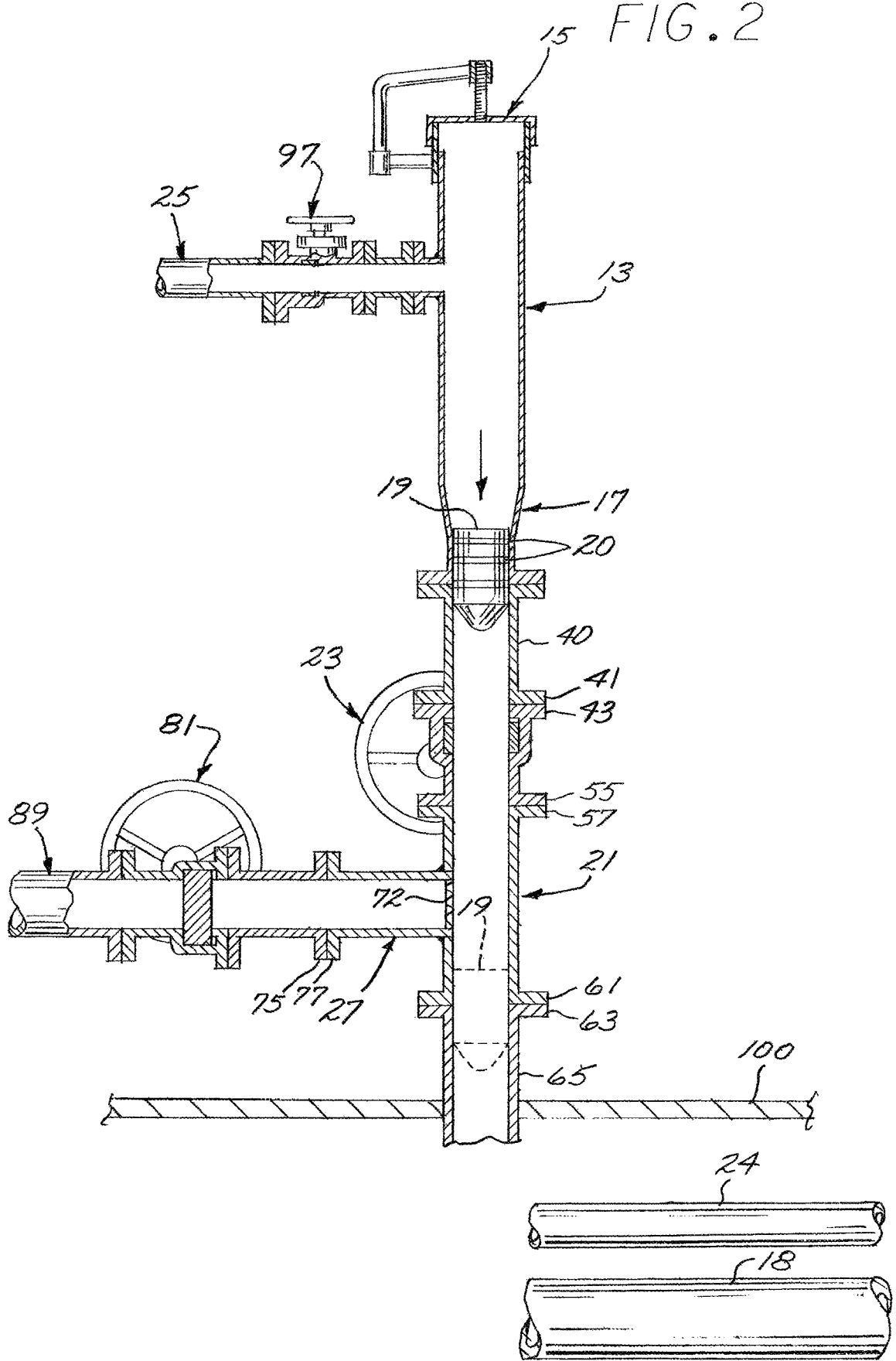
FIG. 2 is a vertical sectional view of the pig launcher shown in FIG. 1.

As noted, a pig 19 typically includes compressible elements such as flexible mesh or elastic bristles on its exterior surface to, at their racially out extent, frictionally engage the interior wall of the reducer to generate a braking force to resist free fall of the pig. These bristles are depicted in FIG. 2 as the compressible rings 20. Consequently, the pig 19 to be launched may be inserted in the open, upper extremity of the barrel 13 to be directed to the reducer 17 where the outer diameter of the pig will be partially compressed. The closure 15 may be closed and the pipeline valve 81 partially opened to throttle fluid flow below the bottom of the barrel 13 at a low flow rate. Pressure may concurrently be introduced from the kicker pipe to apply pressure to upper end of the pig 19 creating a pressure differential there across to control movement of such pig downwardly through the reducer to further bend the bristles to compress the diametrical distal ends radially inwardly to allow the pig to pass along to the lower end of the reducer. In this manner the frictional braking resistance of the interior wall of the reducer on the bristles will resist the gravitational pull on the pig thus slowing the rate of travel. The pig will further be forced on down through the open launcher valve 23 and through the connector pipe 21. The launcher valve 23 may then be closed and the pipeline valve 81 opened more fully to introduce a greater flow rate of fluid through the feed pipe 27 to generate a high pressure differential across the pig to drive the pig down into the pipeline 18 which may, in many instances, be below ground to then be driven along the pipeline under pressure of the pipeline fluid.

In the operation of pipelines, pigs are frequently utilized for cleaning and/or inspection and may be introduced at various locations along the pipeline utilized to transport fluid such as oil or natural gas. However, one location where they are not as frequently utilized is at the start of branch lines from well pads to the main pipeline 18 or branch line 24. This is due to space constraints on the well pad. A typical start of a branch line 24 for oil is referred to, in the field, as a Lease Automatic Custody Transfer units or LACT unit and lead to the pipeline so are convenient sites for access to the oil pipeline. Water and natural gas pipelines are often started at the well pad as well and may come directly off a booster or compressor station used to get the water and gas up to pipeline pressures. The header design integrated into the pig launcher allows for multiple LACT units to be easily connected together at multiple well pads. The vertical design of a launcher provides more functionality than pigging valves because a wider variety of pigs can be used and there is significant space savings when compared to the traditional horizontal pig launcher.

Referring to FIG. 1, my launcher connects a supply pipe, generally designated 35, to the pipeline via the kicker pipe 25 and the feed pipe 27. Conveniently, in the preferred embodiment, the pipes 21 and 27 are formed by a Tee construction. Mounted in the side wall of the barrel 13 is a vent valve 37 to relieve pressure by draining fluid prior to opening the closure 15.

In the preferred embodiment, reducer 17 acts as a concentric funnel reduced in internal diameter to form an interface fit with the unconstrained pig and configured on its lower portion with a bolt flange 41 (FIG. 1). As will be appreciated by those skilled in the art, the reducer could be of other construction such as an eccentric configuration, it only being important that it be reduced-in-diameter to compress the pig to the diameter of the pipeline. The launcher valve 23 includes a bolted body formed on its opposite ends with bolt flanges 43 and 55, the flange 43 being bolted to a fitting 40 connected to the flange 41. The flange 55 is bolted to the flange 57 of the pipe 21.

The connector pipe is formed on its lower extremity with a bolt flange 61 mated with a bolt flange 63 of a pipe 65 leading to the pipeline which may be, for instance, laid below ground.

As noted, the connector pipe 21 is incorporated in a Tee-fitting with a branch leading from the side thereof to form the feed pipe 27 which then connects the pipeline valve 81 through a fitting having the bolt flanges 75 and 77 on the opposite ends.

The supply line leads to a feed-line Tee fitting 89 incorporated in the supply pipe 35. One end of the T-fitting 89 includes a bolt flange 91 mated with a bolt flange 93 of the kicker line 25.

The kicker line 25 includes a kicker valve 97 at the upper end thereof having a body formed on its opposite ends with bolt flanges 101 and 103 mating with respective bolt flanges 105 and 108 to connect to the upper extremity of the vertical barrel 13. The supply pipe 35 connects with the T-fitting 89 which also includes a fitting stub 90 shut off at one side by a blind plate 92 to provide an access to the T-fitting 89 and act as a header to connect additional LACT units or other items that start a branch line.

As will be appreciated by those skilled in the art, the various bolt flanges form joints which may include seals and which may be easily connected by conventional bolts.

In practice, the device includes a grill, generally designated 72, mounted over the inlet from the supply pipe 27 (FIG. 2) to block the pig from hanging up in such inlet but allowing for inflow of fluid.

In operation, it will be appreciated that the launcher device of the present invention may be conveniently and easily mounted on a well pad 100 (FIG. 2) and connected with a pipeline 18. When it is desirable to pig the pipeline 18, with the pipeline valve 81 partially open and the kicker valve 97 and launcher valves 23 closed, the closure 15 may be opened and the pig 19 inserted from the top end to fall or be pressed down through the barrel 13 to be caught by the reducer 19 which serves to commence progressively compressing the exterior diameter to that of the reduced end of the reducer corresponding with the internal diameter of the pipeline 18. The closure 15 may then be closed and the kicker valve 97 opened, the pipeline valve 81 throttled, and the pipeline supply valve 81 closed with the launcher valve 23 open. The barrel 13 will thus be pressurized to generate a pressure differential across the pig 19 forcing it downwardly through the narrow end of the reducer 39 to force it down through the control valve 23 and past the grill 72 as shown in broken lines in FIG. 2 to thereby be introduced into the pipeline 18. As will be understood by those skilled in the art, pressure behind the pig will drive it through the pipeline to perform its work on the pipeline to be caught by a pig catcher which may be located some distance downstream in the pipeline. It will be appreciated by those skilled in the art that some commercially available pigs are constructed with articulated bodies to accommodate the turn into the pipeline.

As will further be appreciated by those skilled in the art, unconstrained pigs typically carry compressible flexible mesh or elastic brushes, scrubbers, seals or the like which, in the uncompressed state, form outside diameters slightly larger than the inside diameter of the pipeline 18 to be scrubbed to thereby form an interference fit with the interior surface of the pipeline and provide frictional braking forces to resist gravitational pull on the pig. Likewise, an interference fit will be formed between the pig and the narrow end of the reducer 39. My launcher may be configured to accommodate pigs of various different constructions and configurations. It is intended to control entry of such pigs into the pipeline in such a manner as to avoid accidents or damage to the pigs or pipelines themselves. It allows for pigging multiple LACT units connected together at the branch line 24. Further my pig launcher is economical to manufacture and occupies minimal space on the well pad. As used herein, the term "compressible" or "compressed" is intended to mean capable of being bent or flexed to vary the outside diameter formed by the radial outer extent of the bristles or other flexible elements defining the braking elements.

It will be apparent from the foregoing that while particular forms of the invention have been illustrated and described, various modifications can be made without departing from the spirit and scope of the invention. Accordingly, it is not intended that the invention be limited, except as by the appended claims.

I claim:

1. A prefabricated pig launcher assembly for hydrodynamically launching a pig, the prefabricated pig launcher comprising:
   a vertical barrel having a first vertical barrel end, a second vertical barrel end and an internal diameter from the first vertical barrel end to the second vertical barrel end that is larger than an outer diameter of the pig, the barrel being formed to receive the pig in the first vertical barrel end and to exit the pig from the second vertical barrel end;
   a closure for closing off the first vertical barrel end;
   a reducer disposed below the vertical barrel and having a first reducer end coupled to the second vertical barrel end and a second reducer end, the first reducer end having an inner diameter that matches the internal diameter at the second vertical barrel end, and the second reducer end having an inner diameter that is less than the outer diameter of the pig such that the inner diameter of the second reducer end is configured to resist free fall of the pig through the second reducer end while permitting the pig to pass through the second reducer end in response to fluid pressure applied to the pig;
   a launcher valve disposed below the reducer and having a first launcher valve end coupled to the second reducer end and a second launcher valve end;
   a connector pipe extending below the launcher valve and having a first connector pipe end coupled to the second launcher valve end and a second connector pipe end configured to connect to a pipeline;
   a feed pipe having a first feed pipe end, a second feed pipe end and a pipeline valve between the first feed pipe end and the second feed pipe end, the first feed pipe end being in fluid communication with the connector pipe, and the second feed pipe end being configured to couple to a supply pipe; and
   a kicker line having a first kicker line end in fluid communication with the second feed pipe end and a second kicker line end in fluid communication with the vertical barrel at a point below the closure such that when flow is admitted through the kicker line into the vertical barrel the vertical barrel is pressurized by the flow into the vertical barrel causing the pig to exit the vertical barrel from the second vertical barrel end in a vertical direction through the reducer, the launcher valve and the connector pipe into the pipeline.

2. The prefabricated pig launcher assembly of claim 1, further comprising a grill at an intersection between the feeder pipe and the connector pipe.

3. The prefabricated pig launcher assembly of claim 1, further comprising a branch pipe interposed between the connector pipe and pipeline.

4. The prefabricated pig launcher assembly of claim 1, wherein the reducer is conically shaped.

5. The prefabricated pig launcher assembly of claim 1, further comprising a kicker valve interposed between the second end of the kicker line and the barrel.

6. A prefabricated pig launcher assembly for hydrodynamically launching a pig, the prefabricated pig launcher comprising:
   a vertical barrel having a first vertical barrel end, a second vertical barrel end and an internal diameter from the first vertical barrel end to the second vertical barrel end that is larger than an outer diameter of the pig, the barrel being formed to receive the pig in the first vertical barrel end and to exit the pig from the second vertical barrel end;
   a closure for closing off the first vertical barrel end;
   a reducer disposed below the vertical barrel and having a first reducer end coupled to the second vertical barrel end and a second reducer end, the reducer forming a funnel such that the first reducer end has an inner diameter that matches the internal diameter at the second vertical barrel end, and the second reducer end has an inner diameter that is less than the outer diameter of the pig such that the inner diameter of the second reducer end is configured to resist free fall of the pig through the second reducer end while permitting the pig to pass through the second reducer end in response to fluid pressure applied to the pig;
   a launcher valve disposed below the reducer and having a first launcher valve end coupled to the second reducer end and a second launcher valve end;
   a connector pipe extending below the launcher valve and having a first connector pipe end coupled to the second launcher valve end and a second connector pipe end configured to connect to a pipeline;
   a feed pipe having a first feed pipe end, a second feed pipe end and a pipeline valve between the first feed pipe end and the second feed pipe end, the first feed pipe end being in fluid communication with the connector pipe, and the second feed pipe end being configured to couple to a supply pipe;
   a kicker line having a first kicker line end in fluid communication with the second feed pipe end and a second kicker line end in fluid communication with the vertical barrel at a point below the closure such that when flow is admitted through the kicker line into the vertical barrel the vertical barrel is pressurized by the flow into the vertical barrel causing the pig to exit the vertical barrel from the second vertical barrel end in a vertical direction through the reducer, the launcher valve and the connector pipe into the pipeline; and
   a kicker valve positioned between the second kicker line end and the vertical barrel.

7. A prefabricated pig launcher assembly for hydrodynamically launching a pig, comprising:
   a pig having at least one compressible member positioned on an exterior surface of the pig so that in an uncompressed state the at least one compressible member extends away from the exterior surface of the pig and is configured to compress radially inwardly;
   a vertical barrel having a first vertical barrel end, a second vertical barrel end and an internal diameter from the first vertical barrel end to the second vertical barrel end that is larger than an external diameter of the pig, the barrel being formed to receive the pig in the first vertical barrel end and to exit the pig from the second vertical barrel end;

a closure for closing off the first vertical barrel end;

a reducer disposed below the vertical barrel and having a first reducer end coupled to the second vertical barrel end and a second reducer end, the first reducer end having an inner diameter that matches the internal diameter at the second vertical barrel end, and the second reducer end having an inner diameter that is less than the external diameter of the pig such that the inner diameter of the second reducer end is configured to resist free fall of the pig through the second reducer end while permitting the pig to pass through the second reducer end in response to fluid pressure applied to the pig;

a launcher valve disposed below the reducer and having a first launcher valve end coupled to the second reducer end and a second launcher valve end;

a connector pipe extending below the launcher valve and having a first connector pipe end coupled to the second launcher valve end valve and a second connector pipe end configured to connect to a pipeline;

a feed pipe having a first feed pipe end, a second feed pipe end and a pipeline valve between the first feed pipe end and the second feed pipe end, the first feed pipe end being in fluid communication with the connector pipe, and the second feed pipe end being configured to couple to a supply pipe; and a kicker line having a first kicker line end in fluid communication with the second feed pipe end and a second kicker line end in fluid communication with the barrel at a point below the closure such that when flow is admitted through the kicker line into the vertical barrel the vertical barrel is pressurized by the flow into the vertical barrel causing the pig to exit the vertical barrel from the second vertical barrel end in a vertical direction through the reducer, the launcher valve and the connector pipe into the pipeline.

8. The prefabricated pig launcher assembly of claim 7, further comprising a kicker valve interposed between the second end of the kicker line and the barrel.

* * * * *